(12) United States Patent
Foehr et al.

(10) Patent No.: US 7,202,875 B2
(45) Date of Patent: Apr. 10, 2007

(54) PALETTE-BASED, MULTI-TINT, NAMED COLOR METHODS AND SYSTEMS

(75) Inventors: Oliver H. Foehr, Mercer Island, WA (US); Jesse D. McGatha, Sammamish, WA (US); Michael A. Bourgoin, Lake Forest Park, WA (US)

(73) Assignee: Microsoft Corporation, Redmond, WA (US)

( * ) Notice: Subject to any disclaimer, the term of this patent is extended or adjusted under 35 U.S.C. 154(b) by 218 days.

(21) Appl. No.: 11/112,636

(22) Filed: Apr. 22, 2005

(65) Prior Publication Data

US 2006/0238542 A1  Oct. 26, 2006

(51) Int. Cl.
G06K 9/00 (2006.01)
G09G 5/02 (2006.01)
G09G 5/00 (2006.01)
G06F 3/08 (2006.01)

(52) U.S. Cl. ...................... 345/589; 345/591; 345/593; 382/162; 382/167; 358/518

(58) Field of Classification Search ................ 345/581, 345/589–593, 597, 601, 604; 382/162–167; 358/518–519, 515
See application file for complete search history.

(56) References Cited

U.S. PATENT DOCUMENTS

2005/0102349 A1*  5/2005  Rice et al. ................... 709/201
2006/0098233 A1*  5/2006  Jodra et al. ................. 358/3.26

* cited by examiner

Primary Examiner—Wesner Sajous (57) ABSTRACT

Palette-based, multi-tint, named-color methods and systems utilize a pixel-by-pixel indexing technique in which individual index values into a palette of interest can be used in different ways for rendering associated images across different devices. For some devices, the index values are used to index into the palette of interest to ascertain a specific indexed color value that is then used to render that pixel of the associated image. For other devices, the index value is used as a means to compute a color value that these other devices then use to render that pixel of the associated image.

20 Claims, 5 Drawing Sheets

PALETTE-BASED, MULTI-TINT, NAMED COLOR METHODS AND SYSTEMS

TECHNICAL FIELD

This invention relates to palette-based, multi-tint, named-color methods and systems.

BACKGROUND

Applications that used named colors, such as Pantone®-brand colors, typically either store continuous-tone gray-scale images in an associated file using well-known formats, such as Tagged Image File Format (TIFF), or store an image in a proprietary format, which requires special specific software to render the associated image. In the case in which continuous-tone gray-scale images are used, a device such as a printer processes the gray-scale image as tint levels associated with a particular named color. In the latter case, devices such as printers must be capable of handling the proprietary file format.

In either of these cases, the associated images tend not to be portable. Specifically, these images cannot be easily transported to any device and viewed in a "what you see is what you get" (WYSIWYG) fashion without the use of software that is knowledgeable of the storage format.

Accordingly, this invention arose out of concerns associated with providing improved palette-based, multi-tint, named-color methods and systems.

SUMMARY

In the illustrated and described embodiments, palette-based, multi-tint, named-color methods and systems utilize a pixel-by-pixel indexing technique in which individual index values into a palette of interest can be used in different ways for rendering associated images across different devices. For some devices, the index values are used to index into the palette of interest to ascertain a specific indexed color value that is then used to render that pixel of the associated image. For other devices, the index value is used as a means to compute a color value that these other devices then use to render that pixel of the associated image.

DETAILED DESCRIPTION

Overview

In the illustrated and described embodiments, palette-based, multi-tint, named-color methods and systems utilize a pixel-by-pixel indexing technique in which individual index values into a palette of interest can be used in different ways for rendering associated images across different devices. For some devices, the index values are used to index into the palette of interest to ascertain a specific indexed color value that is then used to render that pixel of the associated image. For other devices, the index value is used as a means to compute a color value that these other devices then use to render that pixel of the associated image.

By using the index values to not only index into actual palletized color values for some devices, but also to compute color values for other devices, images that are rendered across multiple devices can be imparted with more standardized, visually-perceptible color characteristics.

Exemplary Embodiment

In the discussion below, the following terminology will be used. A color model is an abstract mathematical model that describes the way colors can be represented, typically as three or four values or color components. For example, RGB and CMYK are color models. A particular variant or mapping of a color model with a specific gamut or range of colors is said to define a color space. Examples of color spaces include Apple RGB, Adobe RGB, sRGB, scRGB, CIELab, CIELuv, CIEXYZ, CIEJab, SWOP CMYK, Euro-scale CMYK, and the like. Generally, the techniques described in this document can be applied to any well defined color space, regardless of the number of channels, or whether the color model is additive or subtractive, e.g. in any color space for which a conversion to and from a CIE color space can be derived.

A named color is an individual instance of a particular color and typically has a corresponding color value associated with it. For example, named colors can include colors such as white, red, green, blue, yellow, purple, aqua, aquamarine, azure, beige, chartreuse, dark blue, dark orchid and the like. The corresponding color values can assume any suitable format. In at least some embodiments described below, the corresponding color values are represented as hexadecimal values.

A color schema refers to a collection of named colors. Color schemas can be developed by individual companies. Thus, within a particular company's color schema appear its collection of named colors.

A palette refers to a finite collection of color values identified by a unique index within a finite range. In the illustrated and described embodiments, the palettes that are employed have the following characteristics. All named-colors of the palette appear on a color continuum between the undiluted named-color value and the white value specified by the color schema. The white value specified by the color schema may vary across different named-color schemas. For example, in some named-color schemas, the white value may refer to the color of a perfect white diffuser (spectrally uniform diffuse reflector) under a specified illuminant. In yet another color schema, the white value may refer to the media white point (i.e. paper white). Furthermore, these color values are sorted in order of decreasing luminance, such that the white color is the first palette entry (e.g., index 0) and the fully undiluted named-color is the last palette entry (e.g., index 255).

Typically, there is a one-to-one correspondence between the number of named colors in a color schema and the number of associated palettes and a collection of palettes provides a mapping from index values to particular color values within a particular color space.

Figure 1:
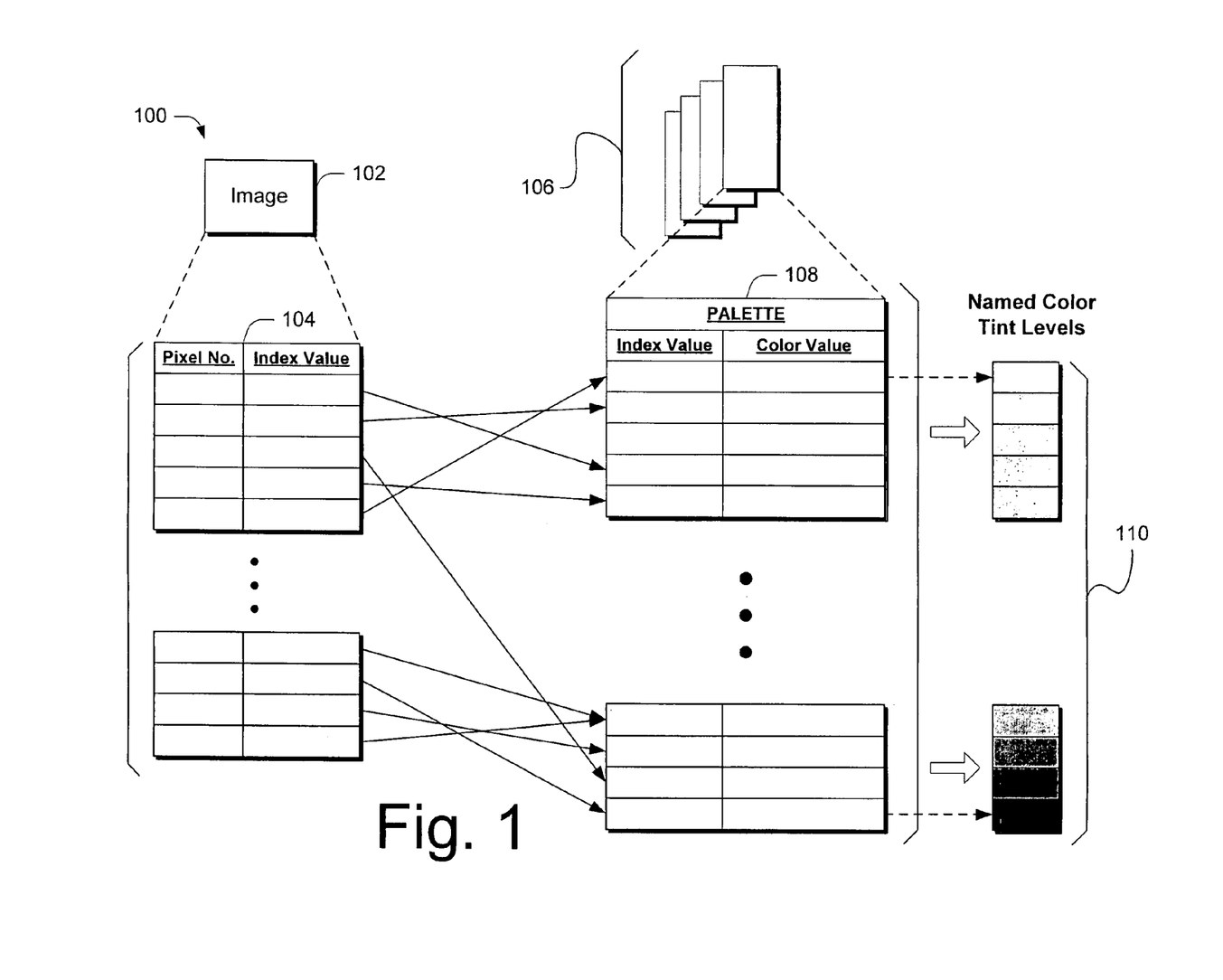
FIG. 1 illustrates an exemplary palette-based, multi-tint, named-color system in which palettes can be employed.

As an example, consider FIG. 1 which illustrates an exemplary palette-based, multi-tint, named-color system in which palettes can be employed, generally at 100. In this particular example, system 100 includes an image 102 that is to be rendered by a device. At this point in the discussion, the type of device is not important. Image 102 can be represented, in an associated file format, as a bitmap comprising a collection of individual pixels. Within any particular file format, there is typically some type of specification, such as specification 104 that specifies, on a pixel-by-pixel basis, the color for each pixel. One way of providing this specification is to use index values that index into a particular palette for a particular named color. Thus, for example, as diagrammatically represented by specification 104, for each pixel (represented by a pixel number in the column designated "Pixel No."), there is an associated index value (represented by a value that appears in a corresponding entry in the column designated "Index Value") that indexes into a palette of interest (which is represented by the arrows that extend from a particular index value to the illustrated palette).

In this particular example, a collection of palettes 106 is illustrated, and each palette of the collection is associated with a particular named color and defines, for the named color, the tint levels for that particular named color. In the illustrated and described embodiment, the file format that is used is only required to contain the palettes for the individual named-colors that are actually used.

As an example, consider palette 108 which, for the associated named color, provides a mapping from index values to color values for that named color. The individual color values that appear in this palette constitute the tint levels for that particular named color. In this example, the various tint levels for the named color of palette 108 are shown by a gradation structure 110, just to the right of the palette. There, tint levels toward the top of the gradation structure constitute more diluted tints of the named color, and tint levels toward the bottom of the gradation structure constitute less diluted tints of the named color.

In the illustrated and described embodiment, the collection of color palettes is associated with a particular color space. Thus, for a given color space, each palette provides a mapping of index values to a particular named color's tint color values for that color space. The tint color values provide a representation of an arbitrary color in a color space that visually matches or at least approximates a particular named color in a particular color schema, mixed to a particular tint level. Accordingly, when rendering that named color in that color space, the index values give the tint color values that are to be used for rendering the pixels of the image. Given this, a device that understands the named color schema, would prefer to use the color schema and would not necessarily need to fall back and rely upon the colors specified in the palettes. In the event, however, that the device does not understand the color schema, the device could fall back and rely upon the colors as specified in the palettes. In the illustrated and described embodiment, palettes can typically be specified in a manner and color space that most if not all devices understand. As such, this approach can provide a nearly universal approach.

Assume now that a particular device does not understand the specified color schema. This device can now use the index values associated with a particular image to index into a particular palette to ascertain the tint color value associated with the index value. Once the tint color value has been ascertained for a particular pixel, the device can render that particular pixel using the color associated with that tint color value. In at least one embodiment, a variation on this approach can store both a device color value and a device independent color value for each index value. This would allow for easier interaction with a particular color management system, as those device independent colors would allow for remapping of the table to target a different device.

For devices that may not necessarily be color-schema aware, it is desirable to specify pixels using color values in a color space that is commonly understood so that pixels are rendered in a visually accurate manner, regardless of the capabilities of the device. Thus, across different devices, renderings of the same image are generally view-consistent.

Using Palette Index Values to Compute Tint Levels

In the example of FIG. 1, the index values represented in a particular file having a particular file format were used to index directly into a particular palette to ascertain a mapping from each index value to a particular color value. These color values were then used to render an image in a particular color space.

In the example described just below, the index values are utilized to compute a tint level in a manner such that the computed tint level, when rendered on a device that may not necessarily be knowledgeable of the particular color space with which the palette color values are associated, can nonetheless present a visually accurate rendering of the image. For purposes of this document, a device may be said to be knowledgeable of a color space if there exists a method, either in the device or in its driver, that embodies a mapping from color values in that color space to color values in the device's native color space such that an acceptable appearance match results. For purposes of this document, a device may be said to be knowledgeable of a color schema, if there exists a method, either in the device or its driver, that embodies a mapping from named colors in that color schema to color values in the device's native color space such that an acceptable appearance match to the original named color results.

Consider first the relationship between a palette's index values and the associated color values. In the FIG. 1 example, the palette has a continuous and evenly-spaced range of non-negative integer index values and each index value corresponds to a particular tint level of a particular named color. In the illustrated example, the various tint levels vary in a generally uniform manner from the fully diluted tint level (i.e. white) through the fully undiluted tint level (i.e. the named color with no dilution). In addition, the index values increment in a generally uniform manner from the index value associated with the fully diluted tint level through the index value associated with the fully undiluted tint level.

By virtue of knowing the relationship between the index values and their associated tint levels, one can derive a function that can be used to compute a tint level, for a particular named color, that can be used to render the tinted named color in a device that may not necessarily be knowledgeable of the color space associated with the color values in the palette or palette collection.

Figure 2:
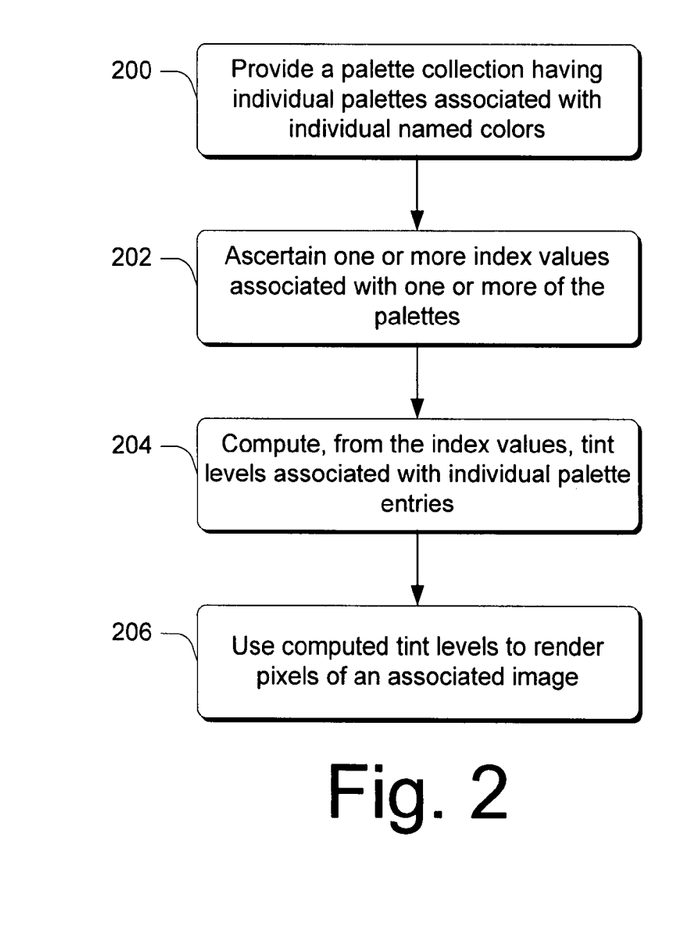
FIG. 2 is a flow diagram that describes steps in a method in accordance with one embodiment.

FIG. 2 is a flow diagram that describes steps in a method in accordance with one embodiment. The method can be implemented in connection with any suitable hardware, software, firmware or combination thereof. In one embodiment, the method can be implemented in software, in a system such as the systems shown and described below in FIGS. 4 and 5.

Step 200 provides a palette collection having individual palettes each of which being associated with individual named colors in a particular color schema. In the illustrated and described embodiment, each of the palettes defines a mapping of index values to associated color values which represent various tint levels for a particular named color in a particular color space. Step 202 ascertains one or more index values associated with one or more of the palettes. This step can be implemented by reading an image from a file having a file format that specifies an index value into a palette for each pixel in the image. Any suitable type of file format can be used, an example of which is provided below. Having ascertained the index values, step 204 computes, from the index values, tint levels associated with individual palette entries. Any suitable method can be used to compute the tint levels, an example of which is provided below. In at least some embodiments, this step is performed so that the image can be rendered on a device which may not necessarily be knowledgeable of the color space associated with the palette. Hence, in these embodiments, this step is performed as a function of the index values themselves, and not as a function of the color values in the palette.

Having computed the tint levels as a function of the index values, step 206 uses the computed tint levels to render pixels of the image.

IMPLEMENTATION EXAMPLE

In the example that follows, the inventive principles described above are employed in the context of the sRGB (which stands for "Standard RGB") color space, as will be appreciated by the skilled artisan. In addition, this example employs the 256-color palette TIFF 6.0 file format. It is to be appreciated that this example is not intended to limit application of the claimed subject matter to the sRGB color space, a 256-color palette, the TIFF 6.0 file format or 8-bit-per-color representations. Rather, the inventive principles can be utilized in connection with other color spaces, differently sized palettes, different file formats and/or bit-per-color representations, without departing from the spirit and scope of the claimed subject matter. For example, aspect of the inventive principles can be extended to apply to duotone images, tritone images and the like. As will be appreciated by the skilled artisan, duotone and tritone images are images that are colored with tints of two or three different named colors.

Figure 3:
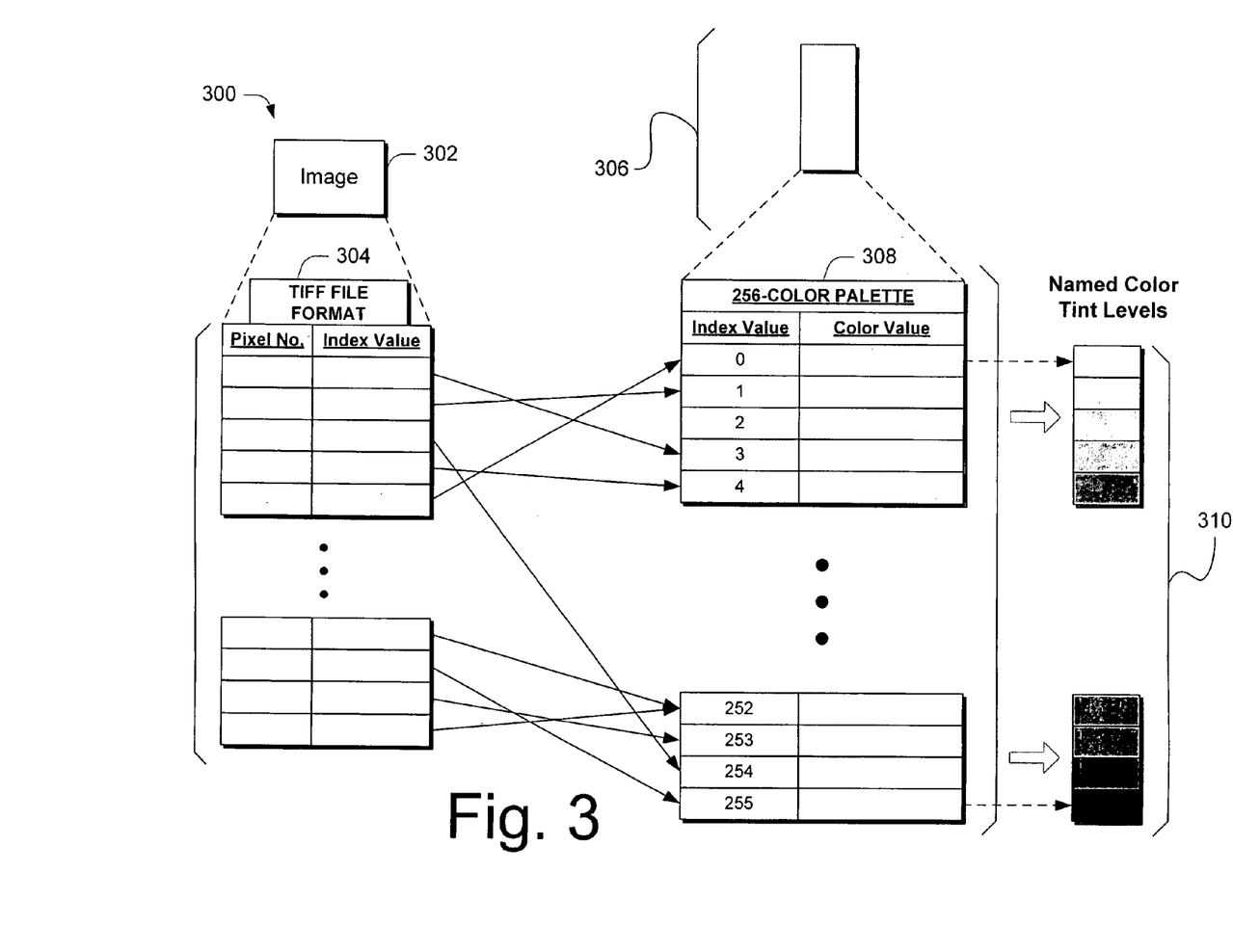
FIG. 3 illustrates an exemplary system in which palettes can be employed in accordance with one embodiment.

Consider FIG. 3 which uses like numerals from the FIG. 1 example to depict like elements in system 300. In this example, image 302 is described in the TIFF 6.0 file format that provides a specification 304 of pixels numbers to index values that index into a 256-color palette 308, in a similar way as was discussed above in FIG. 1. In this example, each palette entry (i.e. index value) in palette 308 is I treated as an evenly distributed tint level of the particular named color to which the palette corresponds. Hence, a palette entry of "0" represents the fully diluted named color and a palette entry of "255" represented the fully undiluted named color. Each pixel of color data in image 302 is stored in the TIFF file as an integer index into a palette of palette collection 306. In the TIFF context, the palette collection comprises a single palette. Each index value (from 0 to 255) in palette 308 maps to a particular 8-bit-per-color sRGB color value. These sRGB color values provide an sRGB color space approximation of the proportional color tints produced by mixing increasing increments of white with the specified named color.

In the illustrated and described example, a tint level is computed by dividing the palette index (i.e. 0 to 255) by 255.0 to obtain a fractional real number value. This fractional real number value pertains to a percentage value that represents some percentage of white mixed with the named color to provide the tint level. In the illustrated and described embodiment, this relationship is an inverse relationship in which, for example, 0/255.0=0 and represents 100% white, and 255/255.0=1 and represents 0% white. Hence, in this example, a device that is knowledgeable of the color schema would use the color schema along with the percentage of white-to-named color that is calculated above. Alternately, a device that is not knowledgeable of the color schema could then use the palette as described above.

Information associated with the color schema, such as which individual named colors are used in a particular image, can be included in the particular file of which the image is a part. Alternately or additionally, this information can be provided outside of the file so that devices that are to compute tint levels as described above will be knowledgeable of the color schema and/or individual named colors that a particular image uses.

In other embodiments, the file format that is employed can include other additional so-called application-private data. This information can include, as noted above, an identification of the named color schema used and/or the named colors used. In addition, this information can further include mappings of the named color tint values to specific colors in alternate color spaces such as, for example, scRGB.

Exemplary Computing Environment

Figure 4:
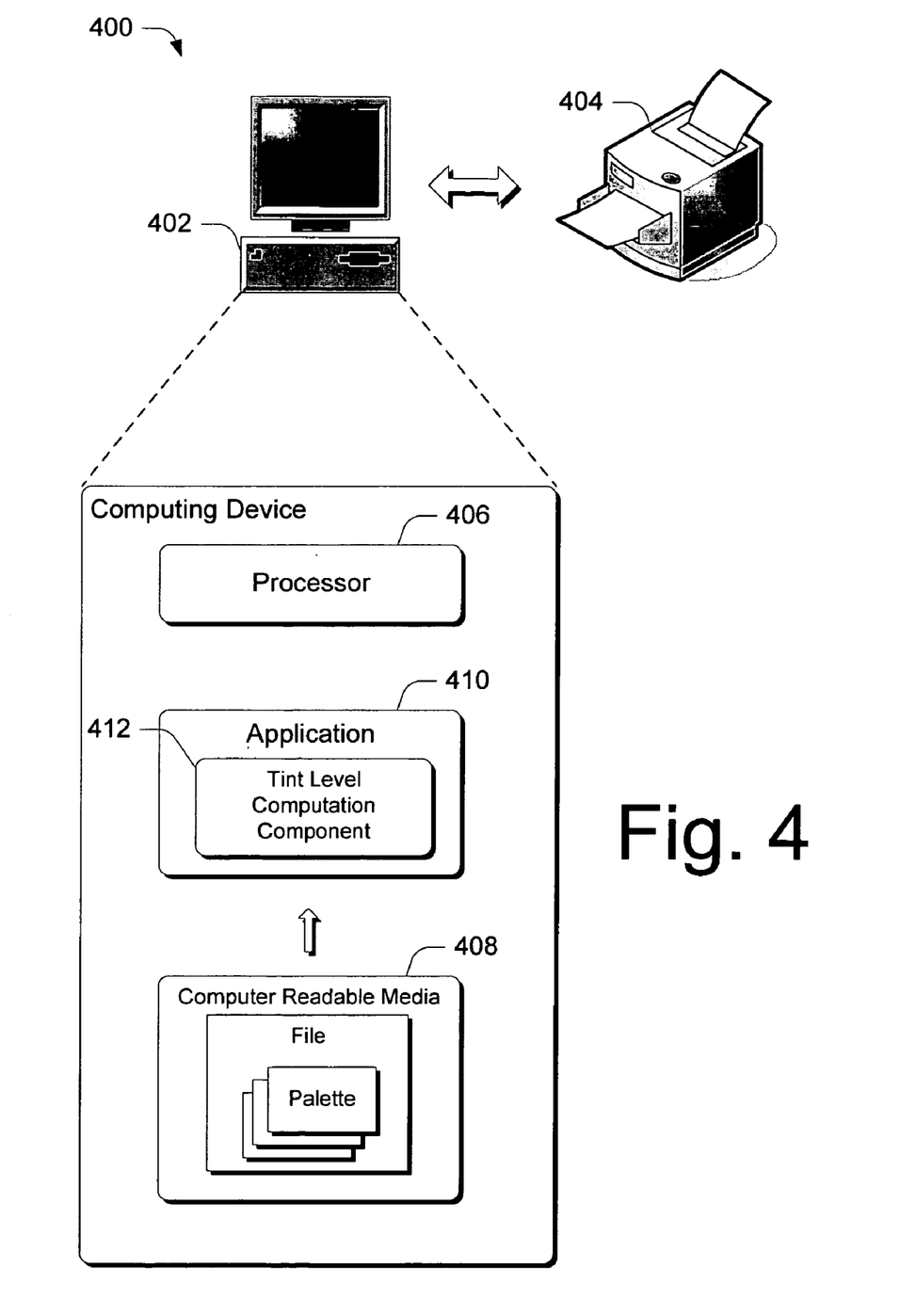
FIG. 4 is a block diagram that illustrates a computing device having a tint level computation component in accordance with one embodiment.

FIG. 4 illustrates an exemplary computing environment, generally at 400, in which the inventive principles can be employed. In this example, computing environment 400 includes a computing device 402 and a printer 404.

Computing device 400 comprises, in addition to other components, one or more processors 406 and one or more computer-readable media 408. In this particular example, the computer-readable media embodies one or more files that contain content that is to be rendered, and individual files contain one or more palettes that can be used, in connection with a particular color space, to provide mappings to color values as described above. In addition, one or more applications 410 are provided and include tint level computation functionality which, in this example, is represented as a a tint level computation component 412 that operates to compute tint levels using index values as described above.

In the particular example above in which the sRGB color space is used, the palette collection can be used to provide mappings of index values associated with individual pixels in an image to associated color values in the sRGB color space. In this way, for example, the image can be rendered on a computer monitor that understands that sRGB color space. Thus, in this particular instance, the index values are used to map directly to color values in the sRGB color space.

Additionally, tint level computation component 412 can be utilized to compute, from the various index values as described above, tint levels that can be utilized to render printed versions of the image on, for example, printer 404. Assume, for example, that printer 404 is a web press printing device and that it is knowledgeable of the color schema or named colors that are employed in an image that is to be printed. By knowing the named color that is to be used for a particular pixel, as well as the amount of white that is to be utilized to provide a particular tint level of the named color, the web press printing device can select the appropriate ink wells and apply the ink to the medium in a manner that provides a visually accurate rendering of the image and one that is generally consistent with the rendering of the image in the sRGB color space.

Exemplary Computing Device

Figure 5:
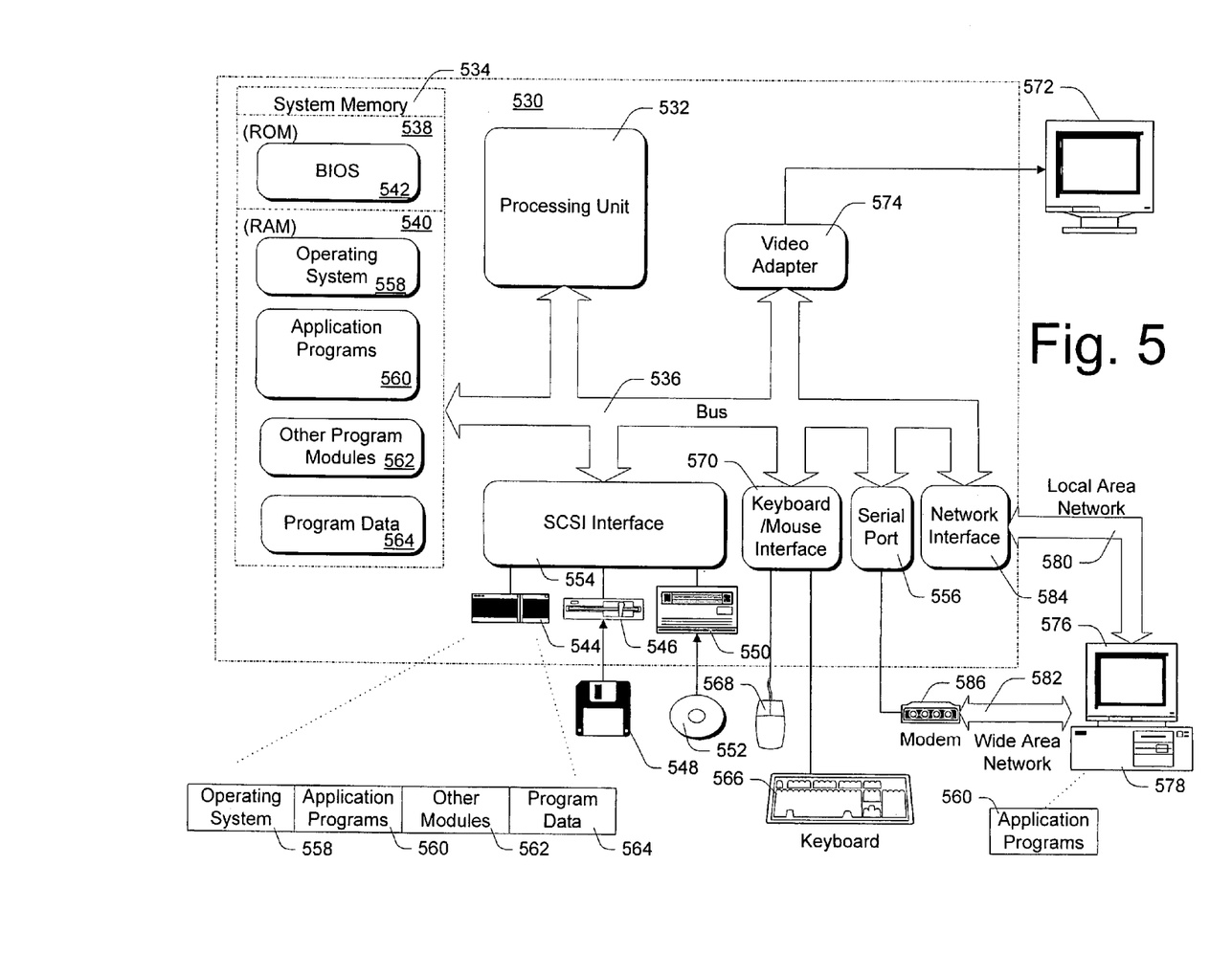
FIG. 5 is a block diagram of an exemplary computing device having components that can be utilized to implement one or more embodiments.

FIG. 5 shows an exemplary computing device having components that can be used to implement one or more of the embodiments described above.

Computer system 530 includes one or more processors or processing units 532, a system memory 534, and a bus 536 that couples various system components including the system memory 534 to processors 532. The bus 536 represents one or more of any of several types of bus structures, including a memory bus or memory controller, a peripheral bus, an accelerated graphics port, and a processor or local bus using any of a variety of bus architectures. The system memory 534 includes read only memory (ROM) 538 and random access memory (RAM) 540. A basic input/output system (BIOS) 542, containing the basic routines that help to transfer information between elements within computer 530, such as during start-up, is stored in ROM 538.

Computer 530 further includes a hard disk drive 544 for reading from and writing to a hard disk (not shown), a magnetic disk drive 546 for reading from and writing to a removable magnetic disk 548, and an optical disk drive 550 for reading from or writing to a removable optical disk 552 such as a CD ROM or other optical media. The hard disk drive 544, magnetic disk drive 546, and optical disk drive 550 are connected to the bus 536 by an SCSI interface 554 or some other appropriate interface. The drives and their associated computer-readable media provide nonvolatile storage of computer-readable instructions, data structures, program modules and other data for computer 530. Although the exemplary environment described herein employs a hard disk, a removable magnetic disk 548 and a removable optical disk 552, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 544, magnetic disk 548, optical disk 552, ROM 538, or RAM 540, including an operating system 558, one or more application programs 560, other program modules 562, and program data 564. In addition, these program modules can implement the functionality described above.

A user may enter commands and information into computer 530 through input devices such as a keyboard 566 and a pointing device 568. Other input devices (not shown) may include a microphone, joystick, game pad, satellite dish, scanner, or the like. These and other input devices are connected to the processing unit 532 through an interface 570 that is coupled to the bus 536. A monitor 572 or other type of display device is also connected to the bus 536 via an interface, such as a video adapter 574. In addition to the monitor, personal computers typically include other peripheral output devices (not shown) such as speakers and printers.

Computer 530 commonly operates in a networked environment using logical connections to one or more remote computers, such as a remote computer 576. The remote computer 576 may be another personal computer, a server, a router, a network PC, a peer device or other common network node, and typically includes many or all of the elements described above relative to computer 530, although only a memory storage device 578 has been illustrated in FIG. 5. The logical connections depicted in FIG. 5 include a local area network (LAN) 580 and a wide area network (WAN) 582. Such networking environments are commonplace in offices, enterprise-wide computer networks, intranets, and the Internet.

When used in a LAN networking environment, computer 530 is connected to the local network 580 through a network interface or adapter 584. When used in a WAN networking environment, computer 530 typically includes a modem 586 or other means for establishing communications over the wide area network 582, such as the Internet. The modem 586, which may be internal or external, is connected to the bus 536 via a serial port interface 556. In a networked environment, program modules depicted relative to the personal computer 530, or portions thereof, may be stored in the remote memory storage device. It will be appreciated that the network connections shown are exemplary and other means of establishing a communications link between the computers may be used.

Generally, the data processors of computer 530 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The embodiments described herein includes these and other various types of computer-readable storage media when such media contain instructions or programs for implementing the steps described above in conjunction with a microprocessor or other data processor. Various embodiments also include the computer itself when programmed according to the methods and techniques described above.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

In the illustrated and described embodiments, palette-based, multi-tint, named-color methods and systems utilize a pixel-by-pixel indexing technique in which individual index values into a palette of interest can be used in different ways for rendering associated images across different devices. For some devices, the index values are used to index into the palette of interest to ascertain a specific indexed color value that is then used to render that pixel of an associated image. For other devices, the index value is used as a means to compute a color value that these other devices then use to render that pixel of an associated image.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   providing a palette collection having individual palettes each of which being associated with an individual named color, individual palettes defining a mapping of index values to associated colors values in a color space which represent various tint levels for a particular named color in a color schema;
   ascertaining one or more index values associated with one or more of the palettes; and
   computing, from the individual index values, tint levels associated with a corresponding named color.

2. The method of claim 1 further comprising using computed tint levels to render pixels of an image.

3. The method of claim 1 further comprising using computed tint levels to render pixels of an image, wherein the act of using the computed tint levels is performed by a device that is knowledgeable of said color schema.

4. The method of claim 1, wherein the color values are used as a fallback in an event the color schema is not understood.

5. The method of claim 1, wherein the color space comprises an RGB color space.

6. The method of claim 1, wherein the act of computing comprises dividing an individual index value by the total number of index values in a particular palette to provide a percentage value that represents some percentage of white mixed with the named color to provide an associated tint level.

7. The method of claim 1, wherein the acts of ascertaining and computing are performed responsive to receiving a file having one or more images, the file having a file format, wherein the one or more images are comprised of individual pixels, and wherein the file format specifies, for individual pixels, index values that map into an individual palette.

8. The method of claim 7, wherein the file format is TIFF 6.0 file format.

9. The method of claim 7, wherein individual palettes comprise a 256-color palette.

10. A method comprising:
providing a palette collection having individual palettes each of which being associated with an individual named color, individual palettes defining a mapping of index values to associated colors values in the sRGB color space which represent various tint levels for a particular named color in a color schema;
ascertaining one or more index values associated with one or more of the palettes; and
computing, from the individual index values, tint levels associated with a corresponding named color, wherein said computing comprises computing tint levels as a function of a palette's index values;
wherein the acts of ascertaining and computing are performed responsive to receiving a file having one or more images, the file having a file format, wherein the one or more images comprise individual pixels, and wherein the file format specifies, for individual pixels, index values that map into an individual palette, wherein the file format is TIFF 6.0 file format and individual palettes comprise a 256-color palette.

11. The method of claim 10 further comprising using computed tint levels to render pixels of an image.

12. The method of claim 11, wherein the act of using the computed tint levels is performed by a device that is knowledgeable of the color schema.

13. The method of claim 10, wherein the act of computing is performed without using the associated color values to which the index values are mapped.

14. The method of claim 10, wherein the act of computing comprises dividing an individual index value by the total number of index values in a particular palette to provide a percentage value that represents some percentage of white mixed with the named color to provide an associated tint level.

15. A method comprising:
receiving a file having one or more images, the file having a file format, wherein the one or more images comprise individual pixels, and wherein the file format specifies, for individual pixels, index values that map into an individual palette of a palette collection, wherein individual palettes each are associated with an individual named color, individual palettes defining a mapping of index values to associated colors values in a color space which represent various tint levels for a particular named color in a color schema;
for devices that are not knowledgeable of the color schema, using individual index values to ascertain an associated color value that can be used to render an associated pixel in a color associated with the color value; and
for devices that are knowledgeable of the color schema, computing, from individual image pixel index values, tint levels associated with a corresponding named color, wherein said computing comprises computing tint levels as a function of a palette's index values, wherein computed tint levels can be used by devices that are knowledgeable of the color schema to render an associated pixel.

16. The method of claim 15, wherein the color space comprises an RGB color space.

17. The method of claim 15, wherein the file format is TIFF 6.0 file format.

18. The method of claim 15, wherein individual palettes comprise a 256-color palette.

19. The method of claim 15, wherein the act of computing comprises dividing an individual index value by the total number of index values in a particular palette to provide a percentage value that represents some percentage of white mixed with the named color to provide an associated tint level.

20. The method of claim 19, wherein:
the color space comprises an RGB color space;
the file format is TIFF 6.0 file format; and
individual palettes comprise a 256-color palette.

* * * * *